United States Patent [19]
Lichtenberg

[11] 4,407,157
[45] Oct. 4, 1983

[54] APPARATUS FOR MEASURING THE DIAMETER OF A BOREHOLE

[75] Inventor: Heinz D. Lichtenberg, Houston, Tex.

[73] Assignee: Dresser Industries, Inc., Dallas, Tex.

[21] Appl. No.: 290,134

[22] Filed: Aug. 5, 1981

[51] Int. Cl.³ .............................................. E21B 49/00
[52] U.S. Cl. .................................. 73/151; 33/178 F; 33/DIG. 5
[58] Field of Search ........... 336/130; 33/125 B, 149 J, 33/DIG. 5, 302, 178 F; 73/151; 367/35

[56] References Cited
U.S. PATENT DOCUMENTS

| | | | |
|---|---|---|---|
| 2,640,271 | 6/1953 | Boucher | 33/174 |
| 3,977,468 | 8/1976 | Brewer et al. | 166/241 |
| 4,205,266 | 5/1980 | Lichtenberg | 324/253 |

Primary Examiner—Jerry W. Myracle
Attorney, Agent, or Firm—Richard M. Bryon; Patrick H. McCollum

[57] ABSTRACT

A well logging instrument has a plurality of contact arms which are forced against the sidewall of the borehole. The contact arms are pivotally attached to a first collar fixed to a central shaft and are pivotally attached to a second collar slidably mounted on the central shaft. Radial movement of the center of the contact arms moves a slidable collar member over an electrical coil assembly emitting an alternating magnetic flux field. The movement of the slidable collar over the electrical coil assembly alters the eddy current loading of a coil. The position of the contact arms and thus the position of the slidable collar attached thereto can be measured by detecting the eddy current loading of the coil.

9 Claims, 6 Drawing Figures

APPARATUS FOR MEASURING THE DIAMETER OF A BOREHOLE

BACKGROUND OF THE INVENTION

This invention relates to apparatus for measuring boreholes and, more specifically, to calipers for measuring the diameter of a borehole.

It is known in the art to measure the diameter of a borehole with a caliper tool, which utilizes a sensing element such as a potentiometer. Typically, these devices utilize spring loaded arms to contact the borehole wall and have connected to the arms one or more elements of a potentiometer for determining the instantaneous borehole diameter.

The disadvantages suffered by this type of caliper include the exposure of the potentiometer wiring and parts to borehole conditions which can lead to corrosion and failure of these parts. This caliper also suffers from the disadvantage of having sliding electronic components that wear mechanically which can lead to inaccuracies and failure. Additionally, pressure terminals through which the electrical and mechanical lead-ins pass must be sealed off against pressure and corrosive fluids.

U.S. Pat. No. 4,205,266, issued to H. D. Lichtenberg and assigned to the assignee of the present invention, describes a borehole caliper intended to overcome the disadvantages of the potentiometer type caliper. This caliper utilizes a flux gate magnetometer for sensing the distance between the flux gate and a magnetic element. The magnetic element is slidably mounted on the caliper body and is attached by mechanical linkage to a borehole contacting arm.

While this caliper represented an improvement in the art of measuring borehole diameter, it has been less than totally successfully. The flux gate magnetometer can be effected by the earth's magnet field and by the magnetic field resulting from current flow in well casing. These effects present problems in accurately calibrating the caliper instrument outside the borehole. Further, the magnetic element can degrade due to exposure to the temperatures and pressure within the borehole.

These and other disadvantages are overcome with the present invention by providing an apparatus for measuring the diameter of a borehole which has no critical elements exposed to the wellbore.

SUMMARY OF THE INVENTION

In a preferred embodiment of the invention, a borehole caliper instrument is provided which includes an elongated support member for carrying a plurality of bow-spring members which are forced against the sidewall of a borehole. One end of each of the bow-spring members is pivotally attached to a first collar member mounted at a fixed position on the support member. The opposite end of each of the bow-spring members is pivotally attached to a second collar member longitudinally slidably on the support member. The second collar member is constructed of a highly conductive material and is disposed so as to move slidably over an electrical coil assembly housed within a non-ferromagnetic housing. The electrical coil assembly is comprised of a pair of electrical coils arranged in a bridge circuit.

The pair of coils are simultaneously driven by an oscillator circuit resulting in an alternating magnetic flux field around the coils. The position of the slidable collar in relation to the coils results eddy currents being established within the conductive material forming the slidable collar. As the slidable collar moves in coordination with the compression and expansion of the bow-spring members attached thereto the eddy current loading of the coil assembly is altered and an electrical signal is derived related to the amount of eddy current loading. This electrical signal provides a measurement of the diameter of the wellbore.

Accordingly, it is a feature of the present invention to provide new and improved apparatus for measuring the diameter of a borehole.

It is another feature of the present invention to provide a borehole caliper instrument with no electrical wiring or connections exposed to the conditions within the borehole.

Yet another feature of the present invention is to provide a wellbore caliper instrument which measures the diameter of a borehole by detecting the eddy current loading effect produced by the position of a conductive body within a magnetic flux field.

These and other features and advantages of the present invention can be understood from the following description of the techniques of producing the invention described in conjunction with the following drawings.

DETAILED DESCRIPTION OF THE PREFERRED EMBODIMENT

Figure 1A:
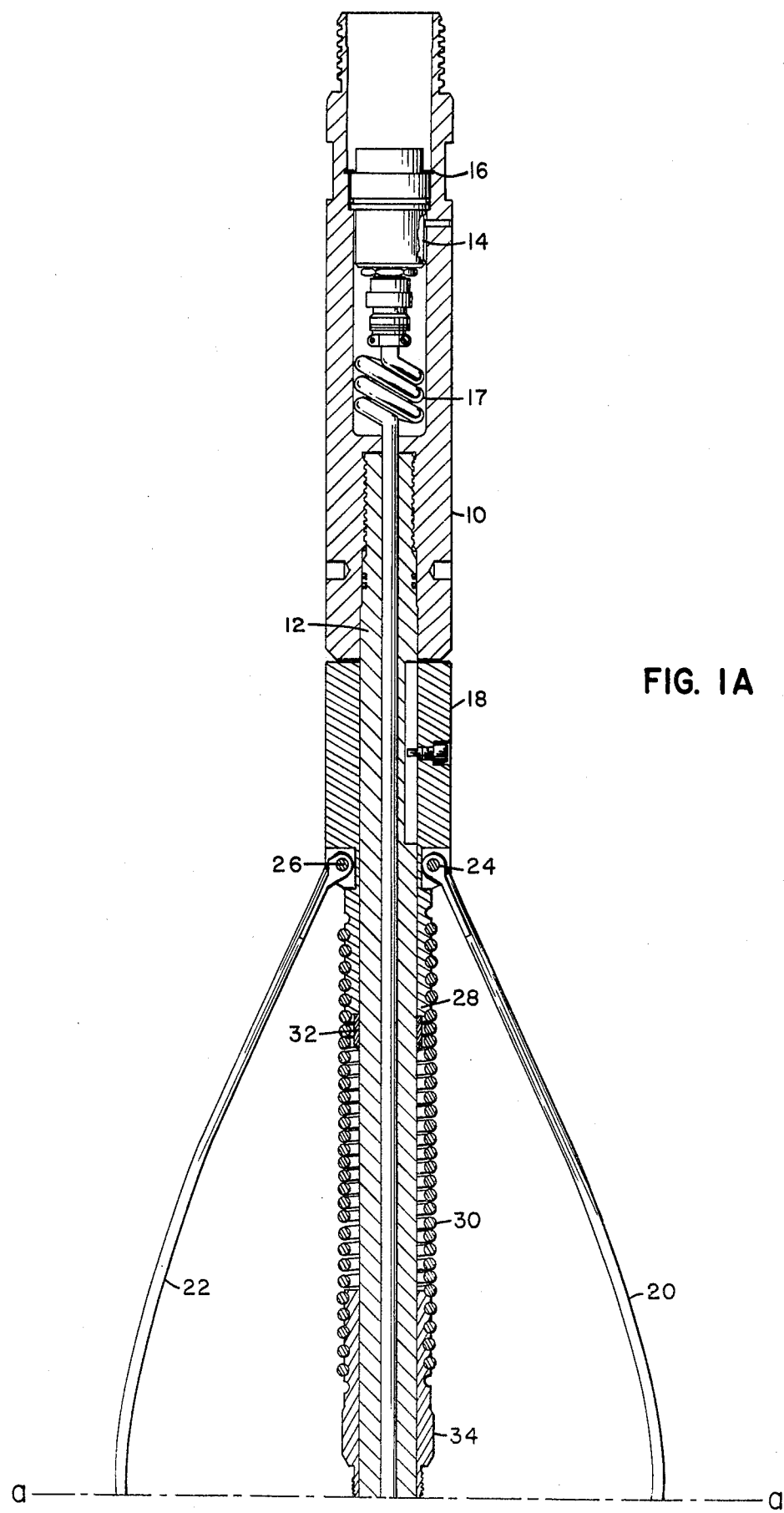
FIGS. 1A through 1C, when joined together at common lines a—a and b—b, illustrate in cross-sectional side view the caliper instrument of the present invention.
Figure 1B:
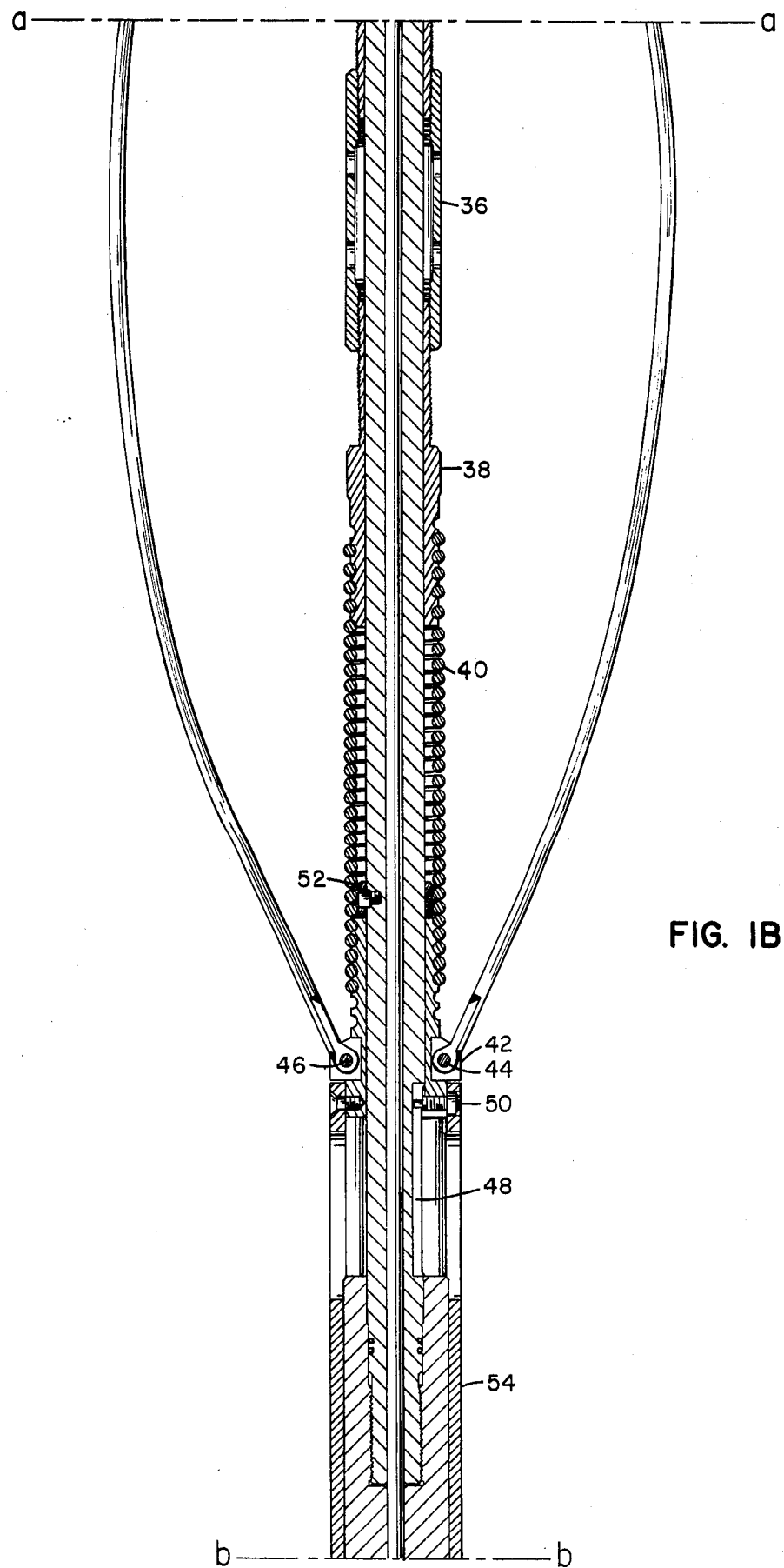
Figure 1C:
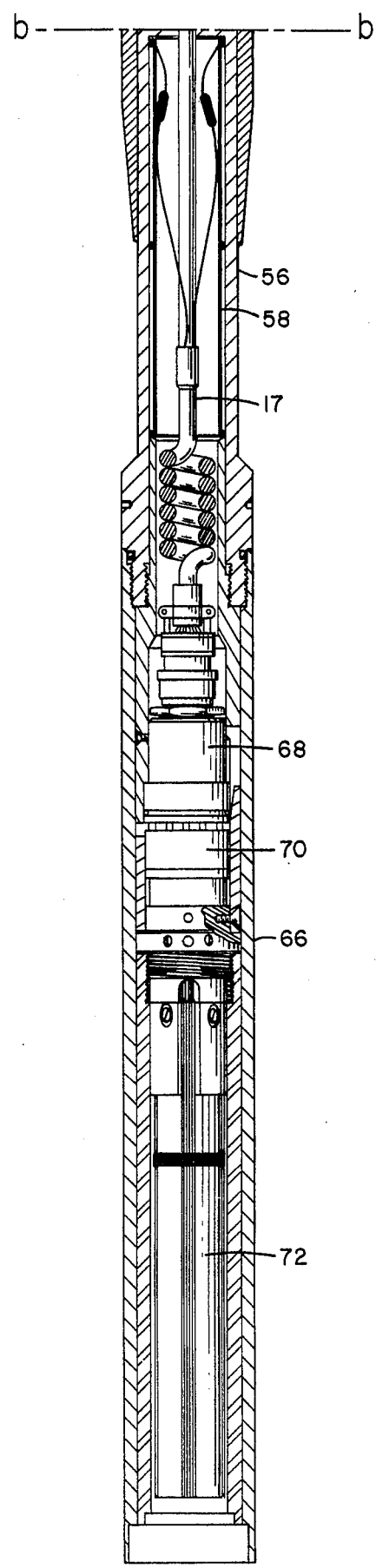

Referring to FIGS. 1A through 1C, there is illustrated the borehole caliper of the present invention. The caliper instrument is comprised of a top sub member 10 threadably attached to an elongated central shaft member 12. An electrical contact block 14 is retained within top sub member 10 by retaining ring 16. Wiring harness 17 connects to electrical contact block 14 and contains the electrical conductors required to provide electrical power to subsurface electronics housed within the caliper.

Fixedly mounted on central shaft member 12 is upper arm holder 18. A plurality of outwardly bowed spring members 20 and 22 are pivotally connected to upper arm holder 18 by spiral pins 24 and 26, respectively. Upper arm holder 18 has an inwardly directed threaded extension 28, the threads on extension 28 having a radius substantially equal to the cross-section of coil spring 30. Limiting collar 32 is affixed to central shaft member 12 to prevent longitudinal movement of upper arm holder 18.

Coil spring 30 is threadably connected to spring holder 34 in a manner similar to the connection to upper arm holder 18. Spring holder 34 is threadably connected to collar member 36 which is further threadably connected to spring holder 38. Threadably attached to spring holder 38 is one end of coil spring 40 the other end of which is similarly theadably attached to lower arm holder 42. Bowed spring members 20 and 22 are pivotally connected by spiral pins 44 and 46 to lower arm holder 42.

Lower arm holder 42 is longitudinally slidable on central shaft member 12. To restrict the distance of longitudinal movement of lower arm holder 42, central shaft member 12 is provided with a longitudinal recess 48. Screw 50 is threadable through lower arm holder 42 a portion thereof protruding into recess 48. The longitudinal movement of lower arm holder 42 is thereby limited to a distance equal to the length of recess 48. Additionally, limiting collar 52 is affixed on central shaft member 12 to stop the longitudinal travel of lower arm holder 42 before the protrusion of screw 50 contacts the abutment of recess 48.

A portion of lower arm holder comprises the eddy current sensor section 54. Lower arm holder 42 including sensor section 54 is preferrably constructed of a highly conductive material, for example copper. Sensor section 54 is constructed with a portion thereof having a uniform outer diameter with a tapered contour of the end portion extending over coil assembly 58. A tapered contour of approximately four degrees is preferrable.

Figure 2:
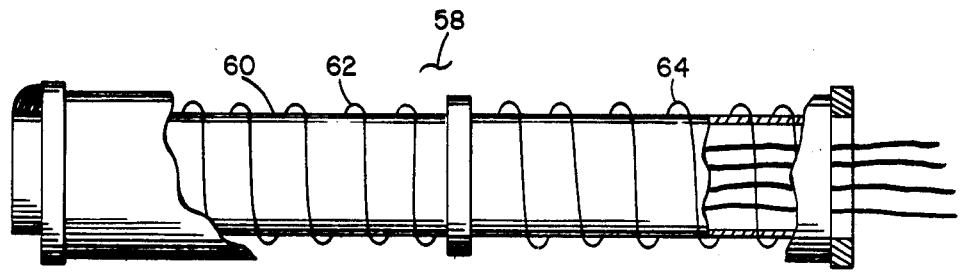
FIG. 2 represents in schematic illustration the components of the coil assembly utilized in the invention.

Threadably attached to central shaft member 12 is sensor housing 56. Sensor housing 56 is constructed of a non-ferromagnetic material, for example titanium. Housed within sensor housing 56 is an electrical coil assembly 58. Referring now to FIG. 2, electrical coil assembly 58 is shown as comprising a coil core 60 upon which is wound two independent electrical coil windings, 62 and 64. In the preferred embodiment coil core 60 is approximately 8.25 inches in length with an inside diameter of 1.334 inches and an outside diameter of 1.41 inches. Coils 62 and 64 comprise approximately 550 turns of 29 gauge wire. The coil assembly 58 is further encapsulated with a high temperature insulating material.

Returning now to FIG. 1, sensor housing 56 is threadably attached to electronics housing 66. Electrical connection to the subsurface electronic is provided by wiring harness 17 connected to electrical contact block 68. Electrical contact block 68 provides electrical contact with electrical contactor 70 attached to the end of subsurface electronic assembly 72. The specific contents and function of subsurface electronic assembly 72 will be explained in detail later herein.

It should be noted that although not specifically illustrated the caliper instrument housing is constructed to withstand the pressures and mechanical and thermal abuses encountered in logging a deep well. Further, although two arm assemblies are illustrated with respect to this instrument, it is possible to include one or more additional arm assemblies on the tool. When additional arm assemblies are utilized they may or may not be equispaced around the tool body.

Figure 3A:
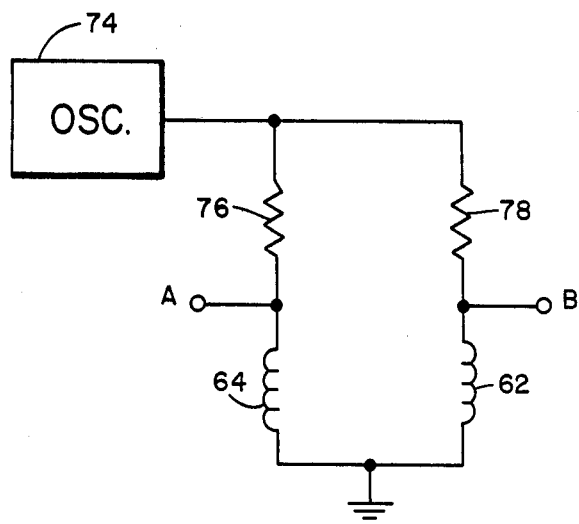
FIG. 3A is an illustration, partly in block diagram, of a portion the subsurface electronic circuitry and the coil assembly of the present invention.
Figure 3B:
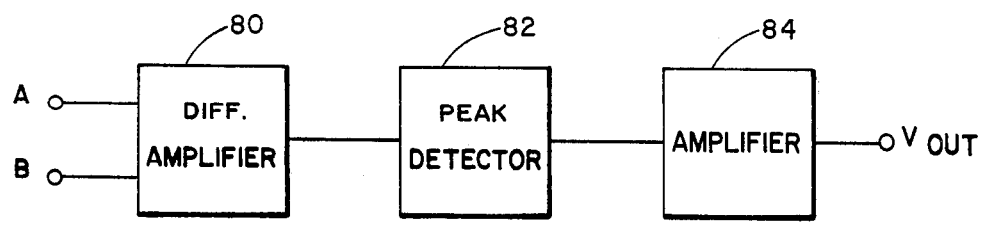
FIG. 3B is a block diagram illustration of the subsurface electronic signal processing circuitry of the present invention.

Referring now to FIGS. 3A and 3B, there is illustrated the subsurface electronic circuitry of the present invention. Oscillator circuit 74 connects to one end of two resistors 76 and 78. The other end of resistor 76 connects to one end of coil 64 and junction A. The other end of resistor 78 connects to one end of coil 62 and to junction B. The opposite end of coil 64 and coil 62 connect to a common reference potential.

As illustrated in FIG. 3B, junction A provides one input to differential amplifier circuit 80 the second input of which is provided by junction B. The output of differential amplifier circuit 80 is coupled to the input of peak detector circuit 82 the output of which is coupled to the input of amplifier circuit 84. The output of amplifier circuit 84 is coupled to the junction Vout.

In typical operation, the apparatus described with reference to FIGS. 1 through 3 serves to provide a signal related to the diameter of the borehole. Coil springs 28 and 40 are mounted in a state of extension causing them to simultaneously exert a drawing force on lower arm holder 42 which translates to a continuous outward bearing force exerted on bow-spring members 20 and 22. Changes in wellbore diameter are translated into compression and expansion of bow-spring members 20 and 22 thereby resulting in transitional movement of lower arm holder 42 in relation to the longitudinal axis of the caliper instrument. The transitional movement of lower arm holder 42 thereby causes the sensor section 54 to move over a portion of coil assembly 58 disposed within sensor housing 56.

Referring now to the electronic portion of the caliper instrument illustrated in FIG. 3, oscillator circuit 74 is connected to inject an alternating current into the electronic bridge assembly composed of resistor 76, resistor 78, coil 62 and coil 64. The alternating current in coil 62 and coil 64 produces an alternating magnetic flux field around the coils. One coil, coil 62 is placed parallel to a conducting material represented by sensor section 54 of lower arm holder 41. As the magnetic field from the coil expands and collapses, small circulating currents are set up on the conductive material of sensor section 54. These circulating currents, referred to as eddy currents, generate their own magnetic fields of opposite polarity to the original field. The opposing fields act as a load on the coil and thus affect the amplitude of the current passing through the coil. As the conductive material of sensor section 54 moves over coil 62 the eddy current loading is altered, thereby altering the coil current and voltage. Thus by measuring the amplitude of the alternating signal injected into coils 62, a measurement of the position change of sensor section 54 can be made.

The amplitude of the alternating signal injected into coils 64 and 62 is monitored at junction A and junction B, respectively. The signals of junction A and B provide the two input signals for differential amplifier circuit 80. The output of differential amplifier circuit 80 is proportional to the difference between the voltages applied to the two inputs, junction A and B. The output of differential amplifier circuit 80 is coupled to peak detector circuit 82 whose output voltage approximates the true peak value of the applied input. The output of peak detector circuit 82 is coupled to amplifier circuit 84 where it is amplified and coupled to the output junction Vout.

As previously herein discussed, the movement of sensor section 54 of lower arm holder 42 above coil 62 provides an eddy current loading effect on coil 62. This loading is reflected by a change in the voltage as seen at junction B. The signal at junction B provides one input to differential amplifier circuit 80 the other input of which is the unloaded signal appearing at junction A. The output of differential amplifier circuit 80 is a voltage signal representative to the position of sensor sleeve 54 in relation to coil 62 of coil assembly 58. Since sensor sleeve 54 is a portion of lower arm holder 42 which moves in direct response to the radial movement of the center of bow-spring members 20 and 22 the output signal of differential amplifier 80 is functionally related to the expansion of bow-spring members 20 and 22 and thus the borehole diameter.

Although a specific preferred embodiment of the present invention has been described in the detailed description above, the description is not intended to limit the invention to the particular forms or embodiments disclosed therein since they are recognized as illustrative rather than restrictive and it will be obvious to those skilled in the art that the invention is not so limited. For example, where as certain materials are cited for the construction of the sensor sleeve and sensor housing, it is obvious that other suitable materials could be substituted therefore. Additionally, the output signal of the amplifier could be first converted to a frequency base signal by a voltage-to-frequency converter before transmission to the surface.

The embodiments of the invention in which an exclusive property or privilege is claimed are defined as follows:

1. A borehole caliper apparatus comprising:
   an elongated body member adapted to traverse said borehole;
   and electric coil assembly including first and second electric coils mounted within a section of said body member for simultaneously emitting an alternating magnetic flux field around each of said coils of said coil assembly;
   a first collar member fixedly attached to said body member;
   a second collar member longitudinally slidably mounted about said body member, said second collar member being constructed of highly conductive material and slidable within the magnetic flux field of one of said first and second electric coils;
   a plurality of borehole-engaging members bridgingly supported between said frist and second collar members; and
   circuit means for generating an electrical signal functionally related to the eddy current loading on said one coil in response to the movement of said second collar member within said magnetic flux field of said one coil, said signal being representative of the diameter of said borehole.

2. The caliper apparatus of claim 1 wherein said coil assembly comprises first and second resistors and first and second electrical coils connected in a bridge configuration.

3. The caliper apparatus of claim 2 further comprising an oscillator circuit for providing an alternating input to said bridge configuration.

4. The caliper apparatus of claim 3 wherein said electrical signal generating means comprises:
   a differential amplifier circuit connected to said bridge configuration, the first input of said differential amplifier being connected to the junction of said first resistor and said one coil and the second input of said differential amplifier being connected to the junction of said second resistor and the other of said electrical coils;
   a peak detector coupled to the output of said differential amplifier circuit for generating an electrical signal approximately the true peak value of the output of said differential amplifier circuit; and
   an amplifier circuit coupled to the output of said peak detector.

5. The caliper apparatus of claim 1 wherein said second collar member is constructed of copper.

6. Apparatus for measuring the diameter of a borehole traversing subsurface earth formations, comprising:
   an elongated body member adapted to traverse a borehole, said body member including a non-ferromagnetic portion;
   an electrical coil assembly mounted within said non-ferromagnetic portion of said body member, said coil assembly including first and second electrical coils wound on a core;
   an oscillator circuit for simultaneously generating an alternating magnetic flux field about said first and second coils;
   a first collar member longitudinally and slidably fixed on said body member;
   a second collar member longitudinally slidable about said body member and said first electrical coil, said second collar member having a substantially uniform outer diameter portion and a tapered contour portion;
   a plurality of equispaced borehole-engaging members pivotally attached to and bridgingly supported between said first and second collar members;
   a spring biasing assembly for outwardly biasing said borehole-engaging members; and
   an electrical circuit coupled to said coil assembly for generating an electrical signal functionally related to the eddy current loading on said first coil in relation to said second coil, said loading resulting from the movement of said second collar member in relation to said first coil.

7. The borehole diameter measuring apparatus of claim 6 wherein said electrical circuit for generating said electrical signal comprises:
   a differential amplifier circuit coupled to said coils for detecting the voltage of the drive signal applied to each of said pair of coils and generating an output signal proportional to the difference therebetween; and
   a peak detector circuit for receiving said difference signal and generating an output signal equal to the peak value thereof.

8. The borehole diameter measuring apparatus of claim 7 wherein said tapered contour portion of said second collar member comprises a taper of approximately 4 degrees.

9. The borehole diameter measuring apparatus of claim 8 wherein said coil assembly comprises:
   a core approximately 8.25 inches in length with an outside diameter of approximately 1.41 inches; and
   first and second electrical coils having approximately 550 turns each of approximately 29 gauge wire.

* * * * *